United States Patent
Arai et al.

(10) Patent No.: US 9,937,709 B2
(45) Date of Patent: Apr. 10, 2018

(54) SURFACE TREATMENT LIQUID FOR POROUS SOUND-ABSORBING MATERIAL, AQUEOUS INKJET INK FOR POROUS SOUND-ABSORBING MATERIAL, AND USES THEREFOR

(71) Applicant: RISO KAGAKU CORPORATION, Tokyo (JP)

(72) Inventors: Sayako Arai, Ibaraki (JP); Hirotaka Yamamoto, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 50 days.

(21) Appl. No.: 15/139,893

(22) Filed: Apr. 27, 2016

(65) Prior Publication Data
US 2016/0318299 A1 Nov. 3, 2016

(30) Foreign Application Priority Data

Apr. 30, 2015 (JP) ................. 2015-093301
Apr. 25, 2016 (JP) ................. 2016-086883

(51) Int. Cl.
*B41J 2/01* (2006.01)
*C09D 11/10* (2014.01)
*C09D 11/30* (2014.01)
*C09D 11/54* (2014.01)
*E04B 1/84* (2006.01)
*C09D 167/00* (2006.01)
*C09D 177/12* (2006.01)
*G10K 11/00* (2006.01)

(52) U.S. Cl.
CPC ............... *B41J 2/01* (2013.01); *C09D 11/10* (2013.01); *C09D 11/30* (2013.01); *C09D 11/54* (2013.01); *C09D 167/00* (2013.01); *C09D 177/12* (2013.01); *E04B 1/84* (2013.01); *G10K 11/002* (2013.01)

(58) Field of Classification Search
CPC . B41J 2/01; C09D 11/10; C09D 11/30; C09D 11/54; C09D 177/12; C09D 167/00; E04B 1/84; G10K 11/002
See application file for complete search history.

(56) References Cited

U.S. PATENT DOCUMENTS

| | | | |
|---|---|---|---|
| 6,566,426 B1 | 5/2003 | Kanaida et al. | |
| 2006/0061643 A1 | 3/2006 | Furukawa et al. | |
| 2008/0280041 A1 | 11/2008 | Nishino et al. | |
| 2009/0128611 A1 | 5/2009 | Kariya et al. | |
| 2010/0026773 A1 | 2/2010 | Schultz et al. | |
| 2012/0026239 A1 | 2/2012 | Yanagi | |
| 2014/0118449 A1 | 5/2014 | Sarkisian et al. | |
| 2015/0105504 A1 | 4/2015 | Verheggen et al. | |

FOREIGN PATENT DOCUMENTS

| | | |
|---|---|---|
| CN | 1632012 A | 6/2005 |
| CN | 101081955 A | 12/2007 |
| CN | 101302378 A | 11/2008 |
| GB | 2382813 A | 6/2003 |
| JP | 8-142500 A | 6/1996 |
| JP | 2004-291549 A | 10/2004 |
| JP | 2004-299386 A | 10/2004 |
| JP | 2005-55845 A | 3/2005 |
| JP | 2008-285969 | 11/2008 |
| JP | 2009-125940 A | 6/2009 |
| JP | 2013-114137 A | 6/2013 |
| JP | 2014-062190 A | 4/2014 |
| JP | 2015-20340 A | 2/2015 |
| WO | WO2012170036 A1 * | 12/2012 |
| WO | 2015/080246 A1 | 6/2015 |

OTHER PUBLICATIONS

Hawkins, T.G.; Studies and Research Regarding Sound Reduction Materials with the Purpose of Reducing Sound Pollution, 2014, p. i-32.*
Yamauchi, T.; Handbook of Physical Testing of Paper, 2002, Chapter 6, p. 267-268.*
International Search Report, dated Jul. 19, 2016, PCT International Application No. PCT/JP2016/062914 (2 pages).
Extended European Search Report, dated Jul. 29, 2016, European Patent Application No. 16167434.6 ( 9 pages).
Official Action, Chinese Patent Application No. 201610270597.0, dated Nov. 1, 2017 (6 pages).

* cited by examiner

Primary Examiner — Robert Jones, Jr.
(74) Attorney, Agent, or Firm — Hamre, Schumann, Mueller & Larson, P.C.

(57) ABSTRACT

A surface treatment liquid for a porous sound-absorbing material,
the surface treatment liquid comprising water and a colorant-fixing component, and the colorant-fixing component comprising at least one component selected from the group consisting of cationic water-dispersible resins, inorganic particles having a median size measured by a dynamic light scattering method of less than 1 μm, and polyvalent metal salts.

15 Claims, No Drawings

SURFACE TREATMENT LIQUID FOR POROUS SOUND-ABSORBING MATERIAL, AQUEOUS INKJET INK FOR POROUS SOUND-ABSORBING MATERIAL, AND USES THEREFOR

CROSS REFERENCE TO RELATED APPLICATION

This application claims benefit of priority under 35 USC 119 based on Japanese Patent Application No. 2015-093301 filed on Apr. 30, 2015 and Japanese Patent Application No. 2016-86883 filed on Apr. 25, 2016; the entire contents of which are incorporated by reference herein.

BACKGROUND OF THE INVENTION

1. Field of the Invention

Embodiments of the present invention relate to a surface treatment liquid for surface treating a porous sound-absorbing material, an aqueous inkjet ink for a porous sound-absorbing material, a surface-treated porous sound-absorbing material, a decorated porous sound-absorbing material, and methods for producing these materials.

2. Description of the Related Art

Sound-absorbing materials such as sound-absorbing panels are produced from porous materials. Because these materials have a multitude of pores at the surfaces and within the interior of the material, and these pores exhibit sound-absorbing performance, they are widely used for interior materials in buildings and vehicles, and as covering materials for speakers and the like.

When used in such situations, because these materials not only require a sound-absorbing function, but also need a high level of decorative design characteristics, decorative methods are required which enable high-quality images to be formed on these sound-absorbing materials without eliminating or impairing the inherent functionality of the porous structure of the base material.

Examples of such decorative methods include methods in which the surface is subjected to three dimensional processing to form unevenness or the like, and methods in which printing is used to form a color or pattern on the material.

Sound-absorbing panels having a design in which a decorative image is formed on the surface of the sound-absorbing base material by printing an ink in a dot-like pattern, and in which the sound-absorbing performance is maintained by the non-printed portions are already known (JP 2008-285969 A).

SUMMARY OF THE INVENTION

It is desirable that a printed image formed on the surface of a sound-absorbing base material not only combines both sound-absorbing performance and good decorative design, but also has good durability, and is adhered to the base material with satisfactory strength.

The present invention has an object of providing technique that enables free formation of an image of excellent durability on a porous sound-absorbing material, thus imparting the material with superior decorative design characteristics, without impairing the sound absorption effects.

One embodiment of the present invention provides a surface treatment liquid for a porous sound-absorbing material, the surface treatment liquid comprising water and a colorant-fixing component, and the colorant-fixing component comprising at least one component selected from the group consisting of cationic water-dispersible resins, inorganic particles having a median size (diameter) measured by a dynamic light scattering method of less than 1 μm, and polyvalent metal salts.

Another embodiment of the present invention provides a method for producing a surface-treated porous sound-absorbing material,
the method comprising a step of applying a surface treatment liquid for a porous sound-absorbing material to a surface of a porous sound-absorbing material,
the surface treatment liquid comprising water and a colorant-fixing component, and the colorant-fixing component comprising at least one component selected from the group consisting of cationic water-dispersible resins, inorganic particles having a median size measured by a dynamic light scattering method of less than 1 μm, and polyvalent metal salts.

Yet another embodiment of the present invention provides a method for producing a decorated porous sound-absorbing material, the method comprising:
a step of applying the surface treatment liquid for a porous sound-absorbing material to a surface of a porous sound-absorbing material, the surface treatment liquid comprising water and a colorant-fixing component, and the colorant-fixing component comprising at least one component selected from the group consisting of cationic water-dispersible resins, inorganic particles having a median size measured by a dynamic light scattering method of less than 1 μm, and polyvalent metal salts; and
a step of performing inkjet printing using an aqueous inkjet ink comprising water, a water-dispersible resin and/or a water-soluble resin, and a colorant.

DESCRIPTION OF THE EMBODIMENTS

Embodiments of the present invention are described below in detail, but the present invention is in no way limited by these embodiments, and needless to say, various modifications and alterations are possible. In the present description, the terms "weight" and "mass" are deemed to have the same meaning, and the term "weight" is used below for the sake of consistency.

In the following description, the porous sound-absorbing material is sometimes referred to as simply "the sound-absorbing material", "the porous base material" or "the base material", the surface treatment liquid for a porous sound-absorbing material is sometimes referred to as simply "the surface treatment liquid" or "the treatment liquid", and the aqueous inkjet ink is sometimes referred to as simply "the ink" or "the aqueous ink".

In the conventional technology described above, because there is a requirement to provide a non-printed region to expose the sound-absorbing base material, the dot density cannot be set too high. Accordingly, a high-precision image cannot be printed, and the resulting product remains unsatisfactory in terms of its decorative design characteristics.

Because of their structure, porous sound-absorbing materials generally absorb liquids at an extremely fast rate. As a result, even if low-viscosity inks such as inkjet inks are printed onto such materials, the ink almost instantaneously permeates into the interior of the base material, making it impossible to achieve satisfactory color development. Inks of higher viscosity such as paints are comparatively less likely to permeate into the interior of the base material, meaning coating of the base material can be achieved more easily, but the type of expressiveness achievable by digital printing cannot be obtained. In addition, if printing is performed using an ink having an extremely large amount of resin within the ink, such as a screen ink, then there is a possibility that the pores of the base material may become blocked, resulting in a deterioration in the inherent sound-absorbing performance of the sound-absorbing material.

In contrast, the inventors of the present invention discovered that by applying a specific surface treatment material to a porous sound-absorbing material prior to printing, an arbitrary image of excellent durability could be formed on the material while maintaining the sound absorption effects, and they were therefore able to complete the present invention.

One embodiment of the present invention uses a surface treatment liquid comprising at least a cationic water-dispersible resin, inorganic particles having a median size of less than 1 μm, or a polyvalent metal salt. This surface treatment liquid can enhance the fixability of ink to the surface of a porous sound-absorbing material without impeding the sound-absorbing performance. As a result, an image having superior color development, suppressed bleeding and excellent durability can be formed across a wide area of the surface of the porous sound-absorbing material.

<Porous Sound-Absorbing Material>

The sound-absorbing material is a soundproof material that exhibits a soundproofing effect by absorbing sound, and comprises a multitude of pores at the surfaces and within the interior of the material, with these pores absorbing sound to provide a soundproofing effect. There are no particular limitations on the material, provided it is a porous body that exhibits this type of functionality, and examples of materials that may be used include materials formed using glass wool, rock wool, resin fiber or metallic fiber or the like, and materials formed from resin foamed bodies, gypsum board, metal foamed bodies, and metal powder sintered bodies. Soundproof materials formed using expanded metals such as aluminum or stainless steel may also be used.

Sound-absorbing materials are typically in the form of boards or panels, namely sheets or plates, but the invention is not limited to such forms.

Among the various possibilities, the use of a porous metal body as the sound-absorbing material is preferred. A porous metal body is a metal body having a structure containing a multitude of very fine pores, and has characteristic properties derived from this porous structure which conventional metals cannot have. In other words, because the material is porous, it is extremely light despite being formed from metal, and because the pores are linked via any of various portions, the material exhibits breathability, permeability and light transmittance. Further, because air or liquids can be retained within the interior of the pores, the material also exhibits shock absorption, sound absorption, water absorption and energy absorption properties. Because the specific surface area increases, the chemical reactivity and the like of the surface also increases. In addition, the material exhibits excellent workability, and can be easily cut or bent. Porous metal bodies combine these types of properties with the characteristic properties of metals such as high conductivity, high thermal conductivity and superior toughness, and are consequently used in all manner of applications.

Examples of porous metal bodies that are used as sound-absorbing materials include materials prepared by press working a nonwoven sheet of aluminum, materials prepared by sintering and porosifying a metal powder of aluminum, copper, magnesium, titanium, stainless steel or nickel or the like, and materials prepared by foaming a molten metal such as aluminum to create air holes and form a porous structure. These types of materials do not suffer from the type of scattering of fibers or particles observed for conventional sound-absorbing materials formed from gypsum board, glass wool, polyethylene terephthalate (PET) fibers or ceramic materials or the like, and can also be easily recycled. Specific examples of commercially available materials that can be used favorably include a metal sound-absorbing material (sheet or plate) "NDC CALME" (NDC Sales Co., Ltd.) that is produced by sintering aluminum powder, the material "Altone" (NICHIAS Corporation) that is produced by press molding aluminum fiber, the material "POAL" (UNIX Co., Ltd.) which is prepared by sandwiching an aluminum nonwoven sheet between sheets of expanded metal and then crimping and rolling the resulting structure, and the materials "FULL POROUS" (UACJ Corporation) and "Metasily" (Thermal Co., Ltd.) produced by continuous sintering of aluminum fiber.

Sound-absorbing performance can be represented by the sound absorption coefficient. The sound absorption coefficient α is the ratio of the energy of sound not reflected relative to the energy of the incident sound, and is determined using the following formula.

$$\alpha=(la+lt)/li=(li-lr)/li=1-lr/li$$

α: sound absorption coefficient
li: energy of incident sound (=lr+la+lt)
lr: energy of reflected sound
la: energy of absorbed sound
lt: energy of transmitted sound There are various versions of the sound absorption coefficient, including the normal incident sound absorption coefficient, the random incident sound absorption coefficient and the oblique incident sound absorption coefficient, but the random incident sound absorption coefficient standardized in JIS A 1409 is generally used, and this is measured by the reverberation room method.

The sound-absorbing material may be subjected to an arbitrary undercoat application or a hydrophilic treatment prior to the surface treatment described below. In such cases, coating is preferably performed using an aqueous coating material. Further, it is preferred that the undercoat be applied in such a manner that the inherent sound absorption of the sound-absorbing material is not impaired.

<Surface Treatment Liquid for Porous Sound-Absorbing Material>

The surface treatment liquid is used for applying to the surface of the porous sound-absorbing material to enhance the color development and the fixability of a printed image, and includes at least water, and at least one colorant-fixing component selected from the group consisting of cationic water-dispersible resins, inorganic particles having a median size measured by a dynamic light scattering method of less than 1 μm, and polyvalent metal salts. In other words, these cationic water-dispersible resins, inorganic particles and polyvalent metal salts that function as colorant-fixing components may be used individually, and it is also preferable that a combination of two or more such components is used.

Here, the term "colorant-fixing component" describes a component that has an action of fixing the colorant in an ink to the surface of the porous base material.

For example, in the case of a metal sound-absorbing material, because a multitude of fine pores in the order of several hundred microns to a thousand microns are formed in the material, if printing is performed without any pre-treatment, then the ink simply penetrates into the interior of the base material, making it very difficult to achieve satisfactory color development. In contrast, by performing an initial surface treatment using the surface treatment liquid described above, the colorant-fixing component adhered to the base material suppresses penetration of the ink into the base material interior, and therefore even when a low-viscosity ink such as an inkjet ink is used, an image of excellent color development can be formed on the surface of the sound-absorbing material.

In the present description, a "surface treatment" means using an arbitrary technique such as a coating treatment to adhere the surface treatment liquid to the sound-absorbing material, and this adhering of the surface treatment liquid is sometimes referred to as "application". Further, the regions to which the surface treatment liquid is adhered may include not only the surface of the sound-absorbing material, but also the interior (inner surfaces) of the pores.

This surface treatment liquid is preferably used as a pretreatment liquid that is applied prior to formation of a printed image using an aqueous inkjet ink.

By using the surface treatment liquid of the present embodiment prior to printing, decoration by on-demand printing using an inkjet ink becomes possible, and an image of superior color development and water abrasion resistance can be formed on the sound-absorbing material in accordance with the needs of the user for free expressions.

[Cationic Water-Dispersible Resin]

Inks generally contain components having an anionic surface charge, and colorants such as pigments are also typically anionic. Accordingly, by using a surface treatment liquid containing a cationic component, and adhering the cationic component to the base material surface in advance, an anionic-cationic reaction occurs with the ink, thereby satisfactorily suppressing permeation of the ink components such as the colorant into the base material, and enabling the colorant to be retained on the base material surface.

The cationic component is preferably a water-dispersible resin, and more preferably composed of water-dispersible resin particles. Investigations conducted by the inventors of the present invention revealed that by using resin particles as a component of the surface treatment liquid, the water abrasion resistance of the image could be further enhanced.

The cationic water-dispersible resin is composed of positively charged resin particles in which the surfaces of the resin particles bear a plus charge, and these particles can be dispersed in particulate form, without dissolution in water, to form an oil-in-water (O/W) emulsion. The cationic functional groups of the resin may exist at the surfaces of the particles, in the same manner as a self-emulsifying resin, or the particles may have been subjected to a surface treatment to adhere a cationic dispersant to the surfaces of the resin particles. Representative examples of the cationic functional group include a primary, secondary or tertiary amino group, pyridine group, imidazole group, benzimidazole group, triazole group, benzotriazole group, pyrazole group or benzopyrazole group, whereas examples of the cationic dispersant include primary, secondary, tertiary or quaternary amino group-containing acrylic polymers, polyethyleneimines, cationic polyvinyl alcohol resins, and cationic water-soluble multibranched polyesteramide resins.

The amount of surface charge on the resin particles can be evaluated using a particle charge meter. By measuring the amount of anions or amount of cations required to neutralize the sample, the amount of surface charge can be calculated. Specifically, the amount of surface charge is preferably +300 µeq/g or greater. Examples of particle charge meters that can be used include the colloidal particle charge meter Model CAS manufactured by Nihon Rufuto Co., Ltd.

A resin that forms a transparent coating film is preferably used as the water-dispersible resin. Further, during production of the treatment liquid, the resin may be added as an oil-in-water resin emulsion.

Representative examples of the water-dispersible resin include ethylene-vinyl chloride copolymer resins, (meth) acrylic resins, styrene-maleic anhydride copolymer resins, urethane resins, vinyl acetate-(meth)acrylic copolymer resins, vinyl acetate-ethylene copolymer resins, and resin emulsions of these resins. Here, the expression "(meth)acrylic resins" includes both acrylic resins and methacrylic resins. These resins may be used individually, or a combination of a plurality of resins may be used. As described below, a resin emulsion incorporating a complex of these resins may also be used.

As described above, a positive surface charge can be imparted to these resins either by introducing cationic functional groups, or by performing a surface treatment with a cationic dispersant or the like.

There are no particular limitations on the particle size of the resin particles, and a plurality of particles having different particle sizes may be combined as appropriate.

In one embodiment, from the viewpoints of ease of retention on the surface of the porous base material, and ease of fixation to the base material surface by heated drying or the like, the resin preferably contains particles having a median size (average particle size or average particle diameter) measured by a dynamic light scattering method of 1 µm or greater. Further, the average particle size of the resin particles is preferably not more than 10 µm, and this enables the functionality of the material as a sound-absorbing material to manifest satisfactorily, without fully blocking the pores of the sound-absorbing material, and good suppression of any deterioration in the inherent sound absorption effect of the sound-absorbing material.

In an even more preferred embodiment, the water-dispersible resin comprises large particles having a median size (average particle size) measured by a dynamic light scattering method of at least 1 µm but not more than 10 µm, and small particles having a median size (average particle size) measured by a dynamic light scattering method of less than 1 µm.

In other words, in one preferred embodiment, the surface treatment liquid for a porous sound-absorbing material comprises water and a cationic water-dispersible resin, wherein the cationic water-dispersible resin includes large particles having a median size measured by a dynamic light scattering method of at least 1 µm but not more than 10 µm, and small particles having a median size measured by a dynamic light scattering method of less than 1 µm.

In this embodiment, a surface treatment liquid comprising two cationic water-dispersible resins having specific particle sizes is used. These resin particles enhance the fixability of ink to the surfaces of the porous sound-absorbing material without impairing the sound-absorbing performance, and can also improve the water abrasion resistance. As a result, an image having superior color development, no bleeding and excellent durability can be formed across a wide area of the surface of the porous sound-absorbing material.

More specifically, by using a combination of resin particles having a large particle size and resin particles having a small particle size in the treatment liquid, appropriate voids can be retained in the treated sound-absorbing material without full blocking of the voids required for achieving the sound absorption properties of the porous sound-absorbing material. It is thought that by fixing an ink to the surface treatment layer formed from these resin particles, the printed ink does not also block all of the voids within the sound-absorbing material, and as a result, an ink layer having superior water abrasion resistance can be formed while maintaining the sound-absorbing performance.

The average particle size of the resin particles describes a volume-based particle size (median value) in a particle size distribution measured using a dynamic light scattering method. Measurements may be performed at 25° C., using an apparatus such as the nanoparticle analyzer nano Partica SZ-100 (Horiba, Ltd.) as the dynamic light scattering particle size distribution measuring apparatus, with the water-dispersible resin diluted with water to a concentration of 0.5% by weight.

In the surface treatment liquid or in the ink described below, a configuration in which the resin particles exist as independent fine particles, and a configuration in which the particles exist in the form of clustered aggregates of the independent fine particles are possible, but the median size measured by the dynamic light scattering method is deemed to represent the "average particle size".

Measurement of the average particle size of the above resin particles in the raw material emulsion state prior to preparation of the surface treatment liquid or ink is preferable in terms of eliminating the effects of the colorant (pigment particles) in the case of an ink, and the thus obtained measured value can be used as the average particle size in the present embodiment.

The average particle size of the large particles is preferably 1 μm or greater, and more preferably 2 μm or greater, and is preferably not more than 10 μm, more preferably not more than 7 μm, and still more preferably 5 μm or less.

The average particle size of the small particles is preferably less than 1 μm, more preferably 500 nm or less, and still more preferably 250 nm or less. Although there are no particular limitations on the lower limit for the average particle size, from the viewpoint of the storage stability of the surface treatment liquid, the average particle size is preferably at least about 5 nm, and more preferably 10 nm or greater.

Moreover, when the average particle size is measured for the mixture of the large particles and the small particles, two peaks preferably exist in the resulting particle size distribution, namely the large particles and the small particles independently have different peak values.

Further, in addition to the difference in average particle size, the large particles and the small particles may also have other points of difference. For example, the large particles preferably have a minimum filming temperature (MFT) of 70° C. or higher, whereas the MFT of the small particles is preferably less than 70° C. This MFT is the temperature required for the emulsion to undergo filming (film formation), and can be measured in accordance with JIS K6828-2. A water-dispersible resin that does not undergo filming at 70° C. is deemed to be included within water-dispersible resins having an MFT of 70° C. or higher.

It is even more preferable that the MFT of the large particles is 100° C. or higher, and the MFT of the small particles is 50° C. or lower, and because the small particles preferably undergo film formation even at room temperature, the MFT is still even more preferably 40° C. or lower.

Furthermore, the difference in the MFT of the large particles and the MFT of the small particles is preferably at least 30° C., more preferably 50° C. or greater, and still more preferably 100° C. or greater.

The molecular structures of the large particles and the small particles may be the same, or particles of different structures may be used.

The large particles are preferably composed of a polymer complex obtained by complexing a polymer having anionic functional groups typified by carboxyl groups, sulfo groups or the like, and a polymer having cationic functional groups typified by amino groups, amide groups or the like, wherein the complex organic particles have a core-shell structure in which the core portion is composed of the anionic polymer and the shell portion is composed of the cationic polymer.

Examples of the anionic polymer in these types of complex organic particles include polymers comprising (meth) acrylic acid as a repeating unit, and more specific examples include styrene-(meth)acrylic acid copolymers. The polymer may also include other vinyl compounds besides the styrene and (meth)acrylic acid capable of undergoing copolymerization with the styrene and (meth)acrylic acid.

Examples of the cationic polymer (basic polymer) in the complex organic particles include polymers comprising a nitrogen-containing monomer, and specific examples include homopolymers and copolymers comprising a nitrogen heterocyclic compound such as N-vinylpyrrolidone, N-vinylcaprolactam, N-vinyloxazolidone or N-vinylimidazole as a repeating unit. Examples of comonomers that may be used for forming a copolymer include one or more compounds selected from among typical vinyl compounds such as styrene, (meth)acrylate esters, vinyl acetate and acrylamide.

In this case, in order to achieve a cationic charge on the surfaces of the particles, the ratio between the amounts used of the anionic polymer and the cationic polymer, reported as a weight ratio, is preferably 3 to 10 parts of the cationic polymer per 1 part of the anionic polymer.

Examples of commercially available products that can be used favorably as these types of complex organic particles include "PP-15" and "PP-17" (both manufactured by Meisei Chemical Works, Ltd.).

From the viewpoint of the ink fixability to the treated base material surfaces, the amount of the water-dispersible resin in the surface treatment liquid (when large particles and small particles are used, the combined solid fractions of both types of particles) is preferably at least 2% by weight, more preferably 3% by weight or greater, and still more preferably 5% by weight or greater. On the other hand, if the viscosity of the treatment liquid is too high, then achieving uniform treatment becomes difficult, and therefore the amount of resin is preferably not more than 50% by weight, and more preferably 30% by weight or less.

Furthermore, in terms of the ratio between the large particles and small particles in those cases where both types of particles are used, if the amount of the small particles is too small relative to the large particles, then there is a possibility that the fixability may be unsatisfactory, whereas if the amount of the small particles is too large, then there is a possibility that the treatment layer may undergo filming and impair the sound-absorbing properties of the base material, and therefore the weight ratio between the two is preferably set so that the amount of small particles is about 0.1 to 1.5 parts per 1 part of the large particles.

[Inorganic Particles]

The surface treatment liquid may contain inorganic particles as the colorant-fixing component. These inorganic particles form an ink-receiving layer that can fix the colorant. At this time, the inorganic particles may actually block the voids of the porous sound-absorbing material, but because the ink-receiving layer formed by the inorganic particles is itself porous layer, the sound-absorbing performance of the porous sound-absorbing material can be favorably maintained.

From the viewpoint of the fixability to the base material, the inorganic particles preferably have a median size measured by a dynamic light scattering method that is less than 1 μm, and the surface treatment liquid preferably contains inorganic particles having an average particle size of less than 1 μm. The surface treatment liquid may also include a portion of inorganic particles having a large particle size.

There are no particular limitations on the type of inorganic particles used, and particles of silica, calcium carbonate, aluminum oxide, or titanium oxide or the like can be used favorably. A combination of a plurality of types of particles may also be used.

In one preferred embodiment, the inorganic particles are positively charged cationic inorganic particles in which the surfaces of the particles bear a plus charge. The surface charge of the inorganic particles can be measured in the same manner as that described above for the surface charge of the resin particles.

From the viewpoint of the ink fixability to the treated base material surfaces, the amount of the inorganic particles in the surface treatment liquid is preferably at least 1% by weight, more preferably 3% by weight or greater, and still more preferably 5% by weight or greater. On the other hand, if the viscosity of the treatment liquid is too high, then achieving uniform treatment becomes difficult, and therefore the amount of the inorganic particles is preferably not more than 40% by weight, and more preferably 30% by weight or less.

[Polyvalent Metal Salts]

The surface treatment liquid may contain a polyvalent metal salt as the colorant-fixing component. The existence of a polyvalent metal salt tends to disrupt the dispersed state of the colorant in the ink, facilitating the formation of an aggregate state. As a result, it is thought that by adhering a polyvalent metal salt to the porous sound-absorbing material, colorant which contacts the polyvalent metal salt undergoes aggregation, and is more readily retained on the surface of the porous sound-absorbing material.

Examples of the polyvalent metal salt include halides, nitrates, sulfates, acetates, fatty acid salts, lactates and the like of divalent or higher metals such as Mg, Ca, Al, Zn and Ba, and combinations of two or more of these salts may also be used.

From the viewpoint of the ink fixability to the treated base material surfaces, the amount of the polyvalent metal salt in the surface treatment liquid is preferably at least 0.5% by weight, more preferably at least 1% by weight, still more preferably at least 2% by weight, still more preferably at least 2.5% by weight, and most preferably 3% by weight or greater. On the other hand, from the viewpoints of the treatment liquid stability and the image uniformity, the amount of the polyvalent metal salt is preferably not more than 30% by weight, more preferably not more than 20% by weight, still more preferably not more than 15% by weight, and most preferably 10% by weight or less.

In those cases where a plurality of types of colorant-fixing component are used, the amounts of the water-dispersible resin particles, inorganic particles and polyvalent metal salt may be less than the respective preferred amounts described above.

[Solvent]

Water functions as the solvent, namely the vehicle, for the treatment liquid, and tap water, ion-exchanged water, or deionized water or the like may be used. Water is a solvent having high volatility, and evaporates readily after discharge onto the sound-absorbing material, and therefore has the actions of preventing blockage of the pores of the sound-absorbing material following surface treatment, and preventing any deterioration in the sound absorption function of the sound-absorbing material following surface treatment. Further, because water is harmless and very safe, and suffers none of the problems associated with VOCs, the surface-treated sound-absorbing material can be produced as an environmentally friendly product.

The larger the water content in the surface treatment liquid, the greater the effect of the surface treatment liquid in preventing any deterioration in the sound-absorbing performance of the sound-absorbing material, and therefore water preferably represents at least 60% by weight, and more preferably 65% by weight or greater, of the total weight of the treatment liquid.

Although there are no particular limitations on the upper limit for the amount of water added, in an embodiment in which the treatment liquid contains large particles and small particles of a water-dispersible resin, the water content is preferably not more than 95% by weight, and more preferably 90% by weight or less. In yet another embodiment, the water content is preferably within a range from 85% by weight to 95% by weight.

The solvent of the treatment liquid is preferably composed almost entirely of water, but if necessary, may also include a water-miscible (water soluble) organic solvent besides the water. Organic compounds which are liquid at room temperature and can be dissolved in water can be used as the water-miscible organic solvent, and the use of a water-miscible organic solvent which mixes uniformly with an equal volume of water at one atmosphere and 20° C. is preferable.

Examples of organic solvents that may be used include lower alcohols such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, polyethylene glycol, propylene glycol, dipropylene glycol, tripropylene glycol and polypropylene glycol; glycerols such as glycerol, diglycerol, triglycerol and polyglycerol; acetins such as monoacetin, diacetin and triacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine, 1-methyl-2-pyrrolidone, 1,3-dimethyl-2-imidazolidinone, β-thiodiglycol and sulfolane. The boiling point of the water-miscible organic solvent is preferably 100° C. or higher, and more preferably 150° C. or higher.

These water-miscible organic solvents may be used individually, or a mixture containing two or more solvents may be used, provided the solvents form a single phase with water.

From the viewpoints of viscosity regulation and moisture retention, the amount of the water-miscible organic solvent is preferably not more than 30% by weight of the treatment liquid (or not more than 50% by weight of the solvent).

[Other Components]

The surface treatment liquid preferably also contains a surfactant in order to lower the surface tension of the surface treatment liquid, thereby enabling uniform application to the base material surfaces, or in order to suppress aggregation of the water-dispersible resin particles of small particle size (small particles) or the inorganic particles, thereby improving the storage stability of the liquid.

Surfactants can be broadly classified into compounds in which the hydrophilic portion is either ionic (cationic, anionic, zwitterionic) or nonionic, and in the present embodiment, from the viewpoint of the foaming of the treatment liquid, the use of nonionic surfactants that are resistant to foaming is preferred. Further, although either low-molecular weight surfactants or high-molecular weight surfactants (generally indicating a molecular weight of about 2,000 or greater) may be used, the use of a high-molecular weight surfactant is preferred.

The surfactant preferably has an HLB value of about 5 to 20.

Examples of the nonionic surfactant include esters such as glycerol fatty acid, esters and fatty acid sorbitan esters, ethers such as polyoxyethylene alkyl ethers polyoxyethylene alkyl phenyl ethers and polyoxypropylene alkyl ethers, and ether-esters such as polyoxyethylene sorbitan fatty acid esters.

In the present embodiment, acetylene glycol-based surfactants and silicone-based surfactants can be used favorably.

Examples of commercially available acetylene glycol-based surfactants include the acetylene glycols SURFYNOL 104E and 104H, and SURFYNOL 420, 440, 465, and 485 and the like which have structures in which ethylene oxide has been added to acetylene glycol (Air Products and Chemicals, Inc.), the acetylene glycols OLFINE E-1004, E-1010, E-1020, PD-002W, PD-004, EXP.4001, EXP.4200, EXP.4123 and EXP.4300 and the like (Nissin Chemical Industry Co., Ltd.), and the acetylene glycols ACETYLE-NOL E00 and E00P, and ACETYLENOL E40 and E100 and the like which have structures in which ethylene oxide has been added to acetylene glycol (Kawaken Fine Chemicals Co., Ltd.).

Silicone-based surfactants have an extremely powerful surface tension reduction ability and contact angle reduction ability, and can therefore cause rapid diffusion of the treatment liquid across the surface of the base material even if the surface of the sound-absorbing material is not hydrophilic. As a result, the functional components of the treatment liquid can be fixed uniformly across the surface of the porous base material, meaning the printed ink can be fixed uniformly to the treated portions, enabling a high-quality printed image of superior color development to be obtained.

Among the various silicone-based surfactants, polyether-modified silicone-based surfactants, alkyl/aralkyl-comodified silicone-based surfactants and acrylic silicone-based surfactants are preferred. Commercially available products that can be used particularly favorably include the "SIL-FACE SAG" series (Nissin Chemical Industry Co., Ltd.).

Any of the silicone-based surfactants or the like described above may be used individually, or a combination of a plurality of readily compatible surfactants may be used.

When a surfactant is used, the amount of the surfactant in the surface treatment liquid is preferably at least about 0.1% by weight, more preferably at least 0.3% by weight, and still more preferably 0.5% by weight or greater, but the amount of the surfactant is preferably not more than about 5% by weight, more preferably not more than 4% by weight, and still more preferably 3% by weight or less.

Components other than those described above may also be added to the treatment liquid, provided they do not impair the functionality of the treatment liquid, and examples of these other components include humectants, antifoaming agents, pH modifiers, antioxidants and preservatives.

When the colorant-fixing component is inorganic particles or a polyvalent metal salt, a binder resin may is preferably added to enhance the fixability of the treatment liquid to the base material.

There are no particular limitations on the binder resin, and examples of water-soluble resins that can be used favorably include the aforementioned ethylene-vinyl chloride copolymer resins, (meth)acrylic resins, styrene-acrylic resins, styrene-maleic anhydride copolymer resins, urethane resins, vinyl acetate-(meth)acrylic copolymer resins, vinyl acetate-ethylene copolymer resins, silicone resins, and resin emulsions of these resins. These resins may be added individually, or a plurality of resins may be added. Further, a crosslinking component that causes crosslinking of these resins may also be included. Examples of this crosslinking component include block isocyanates, oxazoline group-containing compounds, (poly)carbodiimides and aziridines, but this is not an exhaustive list. In those cases where the treatment liquid contains a cationic water-soluble resin as the colorant-fixing component, this cationic water-soluble resin can also function as a binder resin.

The treatment liquid can be prepared by dispersing the water and the colorant-fixing component in a conventional dispersion device such as a beads mill, either in a single batch or in a number of separate batches, and then, if desired, passing the resulting dispersion through a conventional filtration device such as a membrane filter.

<Aqueous Inkjet Ink>

The ink for a porous sound-absorbing material according to an embodiment of the present invention, which is used in combination with the surface treatment liquid described above, is an ink that is used for decorating the surface of the surface-treated porous sound-absorbing material, and comprises water, a water-dispersible resin and/or a water-soluble resin, and a colorant. In the present description, the term "decorate" means to ornament, and has the meaning of forming a printed image, whereas the term "decorated" or "decorative" describes an item having a printed image. The decorated portion may cover the entire surface or a portion of the surface of the target item, namely the sound-absorbing material.

The sound-absorbing material prior to printing may be subjected to another arbitrary treatment following surface treatment by the above treatment liquid.

The ink of the present embodiment enables a vivid image to be formed on the sound-absorbing material surface with a small amount of colorant, without impairing the sound-absorbing performance, so that even when the printing area of the image covers the entire surface of the sound-absorbing material, sound-absorbing performance similar to that prior to decoration can be maintained. In this manner, because there is no limit on the recording surface area of the image, a variety of pictures and text and the like can be produced with complete freedom.

In one preferred embodiment, the aqueous inkjet ink for a porous sound-absorbing material is used for decorating the surface of a porous sound-absorbing material that includes a surface treatment layer containing a cationic water-dispersible resin, wherein the ink comprises water, a water-dispersible resin and/or a water-soluble resin, and a colorant, and the cationic water-dispersible resin comprises large particles having a median size measured by a dynamic light scattering method of at least 1 μm but not more than 10 μm, and small particles having a median size measured by a dynamic light scattering method of less than 1 μm.

There are no particular limitations on the water, provided it can function as a solvent, namely a vehicle, for the ink, and tap water, ion-exchanged water, or deionized water or the like can be used. As mentioned above in relation to the surface treatment liquid, water is safe and has high volatility, and therefore blocking of the pores of the sound-absorbing material can be prevented, and deterioration in the sound-absorbing performance of the decorated sound-absorbing material can also be suppressed.

The larger the water content in the ink, the greater the effect in preventing any deterioration in the sound-absorbing performance of the sound-absorbing material, and therefore water preferably represents at least 30% by weight of the total weight of the ink, and more preferably represents at least 60% by weight, and still more preferably 65% by weight or greater, of the total weight of the ink. Further, the water content is preferably not more than 95% by weight, and more preferably 90% by weight or less.

The solvent of the ink is preferably composed almost entirely of water, but if necessary, may also include a water-miscible organic solvent besides the water. One or more of the same solvents as those described above for use in the surface treatment liquid may be selected and used as the water-miscible organic solvent in the ink.

The amount of the water-miscible organic solvent in the ink, or in those cases where two or more water-miscible organic solvents are used, the total amount of these solvents in the ink, is preferably from 5 to 50% by weight, and more preferably from 10 to 35% by weight.

Both pigments and dyes can be used as the colorant, and the pigments and dyes may be used separately, or the two may be combined. From the viewpoints of the weather resistance and print density of the decorative image, a pigment is preferably used as the colorant.

The amount of the colorant is preferably within a range from 0.01 to 20% by weight relative to the total weight of the ink. Further, the amount of the colorant is more preferably at least 0.1% by weight, still more preferably at least 0.5% by weight, and most preferably 1% by weight or greater, and is more preferably not more than 15% by weight, still more preferably not more than 10% by weight, and most preferably 8% by weight or less.

Any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become soluble upon reduction or the like can be used. More specific examples of dyes that may be used include azo dyes, rhodamine dyes, methine dyes, azomethine dyes, xanthene dyes, quinone dyes, triphenylmethane dyes, diphenylmethane dyes, and methylene blue. These dyes may be used individually, or a combination of two or more dyes may be used.

Examples of pigments that may be used include organic pigments such as azo pigments, phthalocyanine pigments, polycyclic pigments and dye lake pigments, as well as inorganic pigments. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Representative examples of the inorganic pigments include carbon black and titanium oxide. These pigments may be used individually, or a combination of two or more pigments may be used.

At least one of a water-dispersible resin and a water-soluble rein is added to the ink to ensure satisfactory fixation of the colorant to the porous base material, and this enables a high level of coloration to be obtained with a small amount of the colorant. A combination of a water-dispersible resin and a water-soluble resin may also be used.

Examples of the water-soluble resin include polyvinyl alcohol, polyacrylic acid, neutralized products of polyacrylic acid, acrylic acid/maleic acid copolymers, acrylic acid/sulfonic acid copolymers and styrene/maleic acid copolymers. These water-soluble resins may be used individually, or a combination of two or more resins may be used.

In the case of a water-dispersible resin, the use of negatively charged anionic resin particles in which the surfaces of the particles bear a minus charge is preferable. These particles can be dispersed in particulate form, without dissolution in water, to form an oil-in-water (O/W) emulsion. The anionic functional groups of the resin may exist at the surfaces of the particles, in the same manner as a self-emulsifying resin, or the particles may have been subjected to a surface treatment to adhere an anionic dispersant to the surfaces of the resin particles. Representative examples of the anionic functional group include a carboxyl group or a sulfo group, whereas examples of the anionic dispersant include anionic surfactants and the like. When the surface is anionic, a chemical interaction occurs with the cationic water-dispersible resin in the aforementioned surface treatment liquid, and as a result, fixation of the colorant can be further strengthened, and the durability of the image can be further improved.

The surface charge on the resin particles can be evaluated by measuring the zeta potential. Specifically, the absolute value of the zeta potential is preferably 30 mV or higher.

A resin that forms a transparent coating film is preferably used as the water-dispersible resin. Further, during production of the ink, the resin may be added as a resin emulsion.

Representative examples of the resin include ethylene-vinyl chloride copolymer resins, (meth)acrylic resins, styrene-maleic anhydride copolymer resins, urethane resins, vinyl acetate-(meth)acrylic copolymer resins, vinyl acetate-ethylene copolymer resins, and resin emulsions of these resins. These resins may be used individually, or a combination of a plurality of resins may be used. Here, the term "(meth)acrylic resin" means both the acrylic resin and the methacrylic resin.

As described above, a minus surface charge can be imparted to these resins either by introducing anionic functional groups, or by performing a surface treatment with an anionic dispersant or the like.

Among these water-dispersible resins (or emulsions thereof), from the viewpoint of achieving stable discharge performance from the inkjet head, and from the viewpoint of achieving favorable adhesion to sound-absorbing materials formed from metal or the like, the use of a urethane resin (emulsion) having a glass transition temperature (Tg) of −35 to 40° C. is preferable. Specific examples of such resin emulsions include the products SUPERFLEX 460, 420, 470 and 460S (product names of carbonate-based urethane resin emulsions), 150HS (a product name of an ester-ether-based urethane resin emulsion), and 740 and 840 (product names of aromatic isocyanate-based ester-based urethane resin emulsions) manufactured by DKS Co., Ltd., and the products NeoRez R-9660 and R-2170 (product names of aliphatic polyester-based urethane resin emulsions), NeoRez R-966, R-967 and R-650 (product names of aliphatic polyether-based urethane resin emulsions) and R-986 and R-9603 (product names of aliphatic polycarbonates) manufactured by DSM N.V.

Furthermore, from the viewpoint of the stability within the ink, the use of a (meth)acrylic resin or a (meth)acrylic resin copolymer is also preferable. Specific examples include the products Mowinyl 966A, 6963 and 6960 (product names of acrylic resin emulsions) and Mowinyl 6969D and RA-033A4 (product names of styrene/acrylic resin emulsions) manufactured by The Nippon Synthetic Chemical Industry Co., Ltd., the products Joncryl 7100, PDX-7370 and PDX-7341 (product names of styrene/acrylic resin emulsions) manufactured by BASF Corporation, and the products VONCOAT EC-905EF, 5400EF and CG-8400 (acrylic/styrene-based emulsions) manufactured by DIC Corporation.

The water-dispersible resin may be composed of a single type of resin (or emulsion thereof) such as a urethane resin or an acrylic resin, or may be composed of a combination of a plurality of resins (or emulsions thereof).

The water-dispersible resin particles that form an emulsion have a particle size appropriate for inkjet printing, and generally, the average particle size (the median size measured on a volume basis using a dynamic light scattering method) is preferably not more than 300 nm. Further, provided the particle size is of this type of size appropriate for inkjet printing, the sound-absorbing performance can be maintained, without fully blocking the pores of the sound-absorbing material. In order to ensure this maintenance of the sound-absorbing performance, the average particle size is more preferably 250 nm or less, still more preferably 200 nm or less, and most preferably 150 nm or less. There are no particular limitations on the lower limit for the average particle size, but from the viewpoint of the storage stability of the ink, the average particle size is preferably at least about 5 nm, and is more preferably 10 nm or greater.

The amount (solid fraction amount) of the water-dispersible resin and/or the water-soluble resin within the ink, reported as a ratio between the colorant and the resin (colorant:resin), is preferably within a range from 1:0.5 to 1:7 (weight ratio). By ensuring that the amount of the resin satisfies this range, good water abrasion resistance and high image quality can be achieved for the image printed on the surface of the porous base material. If the amount of the resin is less than 0.5 parts per 1 part of the colorant, then there is a possibility that the fixability of the pigment may deteriorate, whereas if the amount of the resin is greater than 7 parts, then the viscosity increases, and there is a possibility that the ink may not be able to be discharged satisfactorily from the ink discharge head.

In order to facilitate the dispersion of the pigment in the ink, the ink may also contain an added pigment dispersant if required. There are no particular limitations on the types of pigment dispersants that can be used, provided they enable stable dispersion of the pigment in the solvent, and the use of conventional pigment dispersants typified by polymeric dispersants and surfactants having a pigment dispersion capability is preferable. Specific examples of the polymeric dispersants include the SOLSPERSE (product name) series manufactured by The Lubrizol Corporation, the Joncryl (product name) series manufactured by Johnson Polymer, Inc., and the DISPERBYK series and BYK series manufactured by BYK-Chemie GmbH. Specific examples of the surfactants include anionic fatty acid salts, alkyl sulfates, alkyl ether sulfates, alkylbenzene sulfonates and nonionic polyoxyalkylene alkyl ethers, such as the DEMOL (product name) series of products manufactured by Kao Corporation.

The amount of the pigment dispersant need only be sufficient to enable satisfactory dispersion of the pigment within the solvent, and can typically be set to a weight ratio within a range from 0.01 to 2 parts of the pigment dispersant per 1 part of the pigment, for example.

Furthermore, in order to reduce the surface tension of the ink, thus ensuring good discharge stability upon introduction into an inkjet head, and in order to enable the ink to permeate rapidly into the printing target material, a surface tension reduction agent may be added to the ink. Examples of compounds that can be used as the surface tension reduction agent include surfactants that have the effect of further suppressing aggregation of the water-dispersible resin particles, and for example, the same surfactants as those added to the surface treatment liquid may be used. A surfactant that combines both a pigment dispersion function and a surface tension reduction function may also be used.

The amount of the surface tension reduction agent in the ink is preferably at least about 0.1% by weight, more preferably at least 0.3% by weight, and still more preferably 0.5% by weight or greater. On the other hand, the amount of the surface tension reduction agent is preferably not more than about 5% by weight, more preferably not more than 4% by weight, and still more preferably 3% by weight or less.

Components other than those described above may also be added to the ink, provided they have no adverse effects on the properties of the ink, and examples of these other components include humectants, antifoaming agents, pH modifiers, antioxidants and preservatives.

There are no particular limitations on the method used for producing the ink, and appropriate conventional methods may be used. For example, the ink can be prepared by dispersing all of the components in a conventional dispersion device such as a beads mill, either in a single batch or in a number of separate batches, and then, if desired, passing the resulting dispersion through a conventional filtration device such as a membrane filter. For example, the ink can be prepared by first preparing a mixed liquid by uniformly mixing the total amounts of water and the colorant in advance, dispersing this mixed liquid using a dispersion device, subsequently adding the remaining components to the dispersion, and then passing the resulting dispersion through a filtration device.

<Use of Aqueous Inkjet Ink>

Another embodiment of the present invention provides a use of an aqueous inkjet ink for decorating a porous sound-absorbing material. The porous sound-absorbing material preferably has a surface-treated layer formed using the surface treatment liquid for a porous sound-absorbing material, the details of which are described above. The aqueous inkjet ink comprises water, a water-dispersible resin and/or a water-soluble resin, and a colorant, as is described above.

<Method for Producing Surface-Treated Porous Sound-Absorbing Material>

Production of the surface-treated porous sound-absorbing material (surface-treated sound-absorbing material) is performed by applying the surface treatment liquid containing water and the colorant-fixing component to the surface of a sound-absorbing material. Following adhesion and drying of this treatment liquid, the sound-absorbing material is preferably subjected to inkjet printing using an aqueous ink.

In a preferred embodiment, the method for producing a surface-treated porous sound-absorbing material comprises a step of applying a surface treatment liquid containing water and a cationic water-dispersible resin to the surface of a porous sound-absorbing material, wherein the cationic water-dispersible resin comprises large particles having a median size measured by a dynamic light scattering method of at least 1 μm but not more than 10 μm, and small particles having a median size measured by a dynamic light scattering method of less than 1 μm.

When the surface treatment liquid contains both large particles and small particles as the cationic water-dispersible resin, application of the surface treatment liquid may be performed in two stages. In other words, a surface treatment liquid containing either one of the large particles or the small particles, and a surface treatment liquid containing the other particles may be prepared, and these two surface treatment liquids then applied separately to the sound-absorbing material. When the large particles and the small particles are applied separately, it is preferable that the surface treatment liquid containing the large particles are applied first, because otherwise there is a possibility that the small particles within the surface treatment liquid may penetrate into the interior of the base material, weakening the effect of the particles as a binder for the ink.

Adhesion of the pretreatment liquid to the surface of the sound-absorbing material may be performed by using a brush, roller, bar coater, air knife coater, or sprayer or the like to uniformly coat the surface of the base material, or a printing technique such as inkjet printing, gravure printing or flexographic printing may be used to print an image using the treatment liquid. In other words, the surface treatment liquid may be applied across the entire surface of the sound-absorbing material, or may be applied only to those locations that are required, for example only to those locations onto which inkjet printing is to be performed using the aforementioned ink.

The coating amount (adhesion amount) of the treatment liquid differs depending on the variety and material and the like of the sound-absorbing material, and can therefore not be uniformly specified, but in order to achieve a certain level of color development and gloss for the decorative image without impeding the sound-absorbing performance, the non-volatile fraction amount per unit of coated surface area is preferably about 1 g/m$^2$ to 50 g/m$^2$, and more preferably about 5 g/m$^2$ to 30 g/m$^2$.

<Method for Producing Decorated Porous Sound-Absorbing Material>

The decorated porous sound-absorbing material (decorative sound-absorbing material) is a sound-absorbing material having a printed image on the surface, and the method for producing such a decorative sound-absorbing material comprises a step of applying a surface treatment liquid containing water and a cationic water-dispersible resin, and a step of performing inkjet printing using the aforementioned ink containing water, a water-dispersible resin and/or a water-soluble resin, and a colorant. In other words, a decorated sound-absorbing material can be produced by performing inkjet printing onto the surface of the surface-treated sound-absorbing material described above.

The production may also include other steps besides those mentioned above, such as another pretreatment step or a heating step or the like, but by employing this embodiment, a printed image having excellent abrasion resistance can be formed on the surface of a sound-absorbing material formed from aluminum or the like simply by performing the simple surface treatment described above, without having to perform the typically required boehmite treatment to achieve surface hydrophilization.

In one preferred embodiment, the method for producing a decorated porous sound-absorbing material comprises a step of applying a surface treatment liquid containing water and a cationic water-dispersible resin to the surface of a porous sound-absorbing material, and a step of performing inkjet printing using an aqueous inkjet ink containing water, a water-dispersible resin and/or a water-soluble resin, and a colorant, wherein the cationic water-dispersible resin comprises large particles having a median size measured by a dynamic light scattering method of at least 1 μm but not more than 10 μm, and small particles having a median size measured by a dynamic light scattering method of less than 1 μm.

The inkjet printing to the sound-absorbing material using the aqueous ink may be performed using a typical recording head, and there are no particular limitations on the printing method or the apparatus used. By performing drying following the printing (decoration), the water and other volatile components are volatilized from the ink that has been inkjet printed onto the surface of the sound-absorbing material, and a decorative sound-absorbing material having sound-absorbing performance is obtained which includes an image composed mainly of the water-dispersible resin and the colorant.

There are no particular limitations on the recorded surface area of the image, and any arbitrary pattern or text, or combination of pattern and text or the like, can be selected freely.

Printing conditions which are useful in obtaining a high-quality decorative image include (i) reducing the size of the ink drops, (ii) reducing the printing speed, (iii) performing unidirectional printing, (iv) performing printing while warming the sound-absorbing material, (v) lowering the print resolution, or (vi) using a combination of these printing methods.

The printing condition described above in which printing is performed while warming the porous base material is also very effective, regardless of the performance of the porous base material, in those cases where it is necessary to obtain an image of superior color development using a small amount of ink, and in those cases where it is desirable to perform uniform printing of a pattern on a porous base material having significant surface unevenness or across a plurality of porous base materials having different levels of ink absorption performance. By performing printing while warming the porous base material, the components besides water within the ink, such as the pigment, can be formed in positions close to the surface of the porous base material, and therefore the effect on the sound-absorbing performance and the shape of the porous base material can be minimized, and a stable image can be obtained.

The porous base material may be heated following completion of the printing, and this enables the water and other volatile components within the ink to be volatilized completely, while the colorant in the ink can be fixed to the porous base material by the water-dispersible resin.

Any appropriate method may be used for warming the porous base material, and there are no particular limitations on the heating temperature, provided that the nozzles used for the inkjet printing do not dry out, making the ink discharge unstable. For example, heating may be conducted within a range from 50 to 100° C.

There are no particular limitations on the device used for performing the decoration, and for example, a decorating device can be used which comprises at least a mounting section for mounting the sound-absorbing material, a surface treatment liquid coating section for applying the surface treatment liquid to the surface of the sound-absorbing material, and an inkjet recording head disposed so as to enable inkjet printing by discharging an ink onto the sound-absorbing material. The device preferably also comprises an optional heating section for heating the sound-absorbing material.

More specifically, the decorating device may comprise an input section (such as a scanner) for providing the electronic data (containing a pixel value for each of the pixels) for the decorative image that is to be formed, a recording head section which records an image by discharging an aqueous ink onto the surface of the sound-absorbing material, a transport section which, with the porous base material in a mounted state, transports the porous base material to a location opposing the discharge nozzles formed on the lower surface of the recording head section, and a surface treatment liquid coating section which, prior to the sound-absorbing material reaching the recording head section, applies a surface treatment liquid to the surface of the sound-absorbing material. The device is preferably also provided with a heating section (any of various types of heaters, such as a ceramic heater) which heats the decoration region on the base material at any arbitrary stage during printing, or before or after printing, thereby accelerating the drying of the discharged surface treatment liquid and/or the ink.

<Surface-Treated Porous Sound-Absorbing Material>

The surface-treated porous sound-absorbing material (surface-treated sound-absorbing material) is a sound-absorbing material having a surface treatment layer containing a colorant-fixing component. As described above, this colorant-fixing component comprises at least one component selected from the group consisting of cationic water-dispersible resins, inorganic particles having a median size measured by a dynamic light scattering method of less than 1 μm, and polyvalent metal salts. When the surface treatment liquid used contains one or more other non-volatile components besides the colorant-fixing component, the surface treatment layer also contains those other non-volatile components besides the colorant-fixing component.

The surface treatment layer exists on at least a portion of the surface of the sound-absorbing material, but may also be formed across the entire surface.

In one preferred embodiment, the cationic water-dispersible resin includes both large particles having a median size of at least 1 μm but not more than 10 μm, and small particles having a median size of less than 1 μm. In this case, the surface-treated porous sound-absorbing material comprises a surface treatment liquid containing the cationic water-dispersible resin, and the cationic water-dispersible resin includes large particles having a median size measured by a dynamic light scattering method of at least 1 μm but not more than 10 μm, and small particles having a median size measured by a dynamic light scattering method of less than 1 μm.

<Decorated Porous Sound-Absorbing Material>

The decorated porous sound-absorbing material (decorative sound-absorbing material) comprises a surface treatment layer containing a colorant-fixing component, and a printed image, namely, is composed of the surface-treated sound-absorbing material described above with a printed image formed thereon. The printed image comprises a water-dispersible resin and/or a water-soluble resin, and an arbitrary colorant. When the ink used contains one or more other non-volatile components besides the resin and the colorant, the printed image also contains those other non-volatile components besides the resin and the colorant.

In a similar manner to the surface treatment layer described above, the image exists on at least a portion of the sound-absorbing material, but may also be formed across the entire surface. The ink is fixed to the surface treatment layer and becomes an image having excellent water abrasion resistance. The entire surface treatment layer need not necessarily be covered by the image.

In one preferred embodiment, the decorated porous sound-absorbing material comprises a surface treatment layer containing a cationic water-dispersible resin, and a printed image, wherein the cationic water-dispersible resin includes large particles having a median size measured by a dynamic light scattering method of at least 1 μm but not more than 10 μm, and small particles having a median size measured by a dynamic light scattering method of less than 1 μm.

EXAMPLES

The present invention is described below in further detail based on a series of examples, but the present invention is in no way limited to only these examples. Unless specifically stated otherwise, "%" indicates "% by weight". The blend amounts of the various components shown in the tables also indicate "% by weight".

1. Examples A and B

<Preparation of Surface Treatment Liquids>
[Surface Treatment Liquids A]

The surface treatment liquids A described below are examples of investigations into a variety of surface treatment liquids for porous sound-absorbing materials, with each surface treatment liquid comprising large particles and small particles as the cationic water-dispersible resin.

The components shown in Table 1 were premixed in the proportions shown in Table 1, and the resulting mixtures were then each dispersed for one minute using a homogenizer to obtain surface treatment liquids A1 to A16.

Details relating to the various raw materials shown in Table 1 are as follows.

PP-15: cationic water-dispersible complex organic particles (average particle size: about 1.8 μm, no film formation at 100° C.), manufactured by Meisei Chemical Works, Ltd.

PP-17: cationic water-dispersible complex organic particles (average particle size: about 2.5 μm, no film formation at 100° C.), manufactured by Meisei Chemical Works, Ltd.

SUNPLEX PUE-C200B: a cationic water-based urethane resin emulsion (average particle size: 129 nm, MFT: 0° C.), manufactured by Murayama Chemical Laboratory Co., Ltd.

PASCOL JK-870: a cationic water-based urethane resin emulsion (average particle size: 50 nm), manufactured by Meisei Chemical Works, Ltd.

POLYSOL AP-1370: a cationic water-based acrylic resin emulsion (average particle size: 206 nm, MFT: 10° C.), manufactured by Showa Denko K.K.

POLYSOL AE-803: a cationic water-based acrylic resin emulsion (average particle size: 419 nm, MFT: 0° C.), manufactured by Showa Denko K.K.

POLYSOL AM-3400: a cationic water-based acrylic resin emulsion (average particle size: 620 nm, MFT: 0° C.), manufactured by Showa Denko K.K.

SILFACE SAG503A: a silicone-based surfactant, manufactured by Nissin Chemical Industry Co., Ltd.

SURFYNOL 465: an acetylene glycol-based surfactant, manufactured by Nissin Chemical Industry Co., Ltd.

OLFINE E1010: an acetylene glycol-based surfactant, manufactured by Nissin Chemical Industry Co., Ltd.

The average particle size of each resin was measured using a dynamic light scattering particle size distribution measuring apparatus "Nanoparticle Analyzer nano Partica SZ-100" (manufactured by Horiba, Ltd.), by diluting each resin dispersion with purified water to achieve a particle concentration of 0.5% by weight, and then measuring the volume-based median size at a temperature of 25° C. under settings including a dispersion medium refractive index of 1.333 and a sample refractive index of 1.600, and with the distribution morphology set to "polydispersity" and "narrow".

TABLE 1

Surface Treatment Liquids, Production Example A

| Formulation | | Product name | Average particle size (nm) | Non-volatile fraction concentration | Treatment liquid A1 | Treatment liquid A2 | Treatment liquid A3 | Treatment liquid A4 | Treatment liquid A5 | Treatment liquid A6 | Treatment liquid A7 | Treatment liquid A8 |
|---|---|---|---|---|---|---|---|---|---|---|---|---|
| Cationic large particles (water-dispersible resin particles) | | PP-15 | 1800 | 25% | 31.6 | 31.6 | 9.9 | 49.4 | 31.6 | 31.6 | 31.6 | 31.6 |
| | | PP-17 | 2500 | 26% | | | | | | | | |
| Cationic small particles (water-dispersible resin particles) | | SUNPLEX PUE-C200B | 129 | 32% | 25.0 | 25.0 | 7.8 | | 25.0 | | | |
| | | PASCOL JK-870 | 50 | 30% | | | | | | 27.1 | | |
| | | POLYSOL AP-1370 | 206 | 47% | | | | 26.9 | | | 17.2 | 25.8 |
| | | POLYSOL AE-803 | 419 | 45% | | | | | | | | |
| | | POLYSOL AM-3400 | 620 | 45% | | | | | | | | |
| Surfactant | Silicone-based | SILFACE SAG503A | | 100% | | 1.0 | 3.0 | 3.0 | | 3.0 | 3.0 | 3.0 |
| | Acetylene glycol-based | SURFYNOL 465 | | 100% | | | | | 1.0 | | | |
| | Acetylene glycol-based | OLFINE E1010 | | 100% | | | | | | | | |
| | | Water | | | 43.4 | 42.4 | 79.3 | 20.7 | 42.4 | 38.3 | 48.2 | 39.6 |
| | | Total | | | 100.0 | 100.0 | 100.0 | 100.0 | 100.0 | 100.0 | 100.0 | 100.0 |
| Amount of cationic water-dispersible resin particles (% by weight) | | | | | 16% | 16% | 5% | 25% | 16% | 16% | 16% | 20% |
| Amount of surfactant (% by weight) | | | | | 0% | 1% | 3% | 3% | 1% | 3% | 3% | 3% |
| Non-volatile fraction concentration (% by weight) | | | | | 16% | 17% | 8% | 28% | 17% | 19% | 19% | 23% |

| Formulation | | Product name | Average particle size (nm) | Non-volatile fraction concentration | Treatment liquid A9 | Treatment liquid A10 | Treatment liquid A11 | Treatment liquid A12 | Treatment liquid A13 | Treatment liquid A14 | Treatment liquid A15 | Treatment liquid A16 |
|---|---|---|---|---|---|---|---|---|---|---|---|---|
| Cationic large particles (water-dispersible resin particles) | | PP-15 | 1800 | 25% | 31.6 | 31.6 | 31.6 | 11.9 | 11.9 | | | |
| | | PP-17 | 2500 | 26% | | | | | | 11.5 | 11.5 | 38.5 |
| Cationic small particles (water-dispersible resin particles) | | SUNPLEX PUE-C200B | 129 | 32% | | | | | | | | |
| | | PASCOL JK-870 | 50 | 30% | | | | | | | | |
| | | POLYSOL AP-1370 | 206 | 47% | 8.6 | | | 6.4 | | | | |
| | | POLYSOL AE-803 | 419 | 45% | | 17.8 | | | 6.7 | 6.7 | 20.0 | 22.2 |
| | | POLYSOL AM-3400 | 620 | 45% | | | 17.8 | | | | | |
| Surfactant | Silicone-based | SILFACE SAG503A | | 100% | 3.0 | 3.0 | 3.0 | 1.0 | 1.0 | 1.0 | 1.0 | 1.0 |
| | Acetylene glycol-based | SURFYNOL 465 | | 100% | | | | | | | | |
| | Acetylene glycol-based | OLFINE E1010 | | 100% | | | | 1.0 | 1.0 | 1.0 | 1.0 | 1.0 |
| | | Water | | | 56.8 | 47.6 | 47.6 | 79.7 | 79.4 | 79.8 | 66.5 | 37.3 |
| | | Total | | | 100.0 | 100.0 | 100.0 | 100.0 | 100.0 | 100.0 | 100.0 | 100.0 |
| Amount of cationic water-dispersible resin particles (% by weight) | | | | | 12% | 16% | 16% | 6% | 6% | 6% | 12% | 20% |
| Amount of surfactant (% by weight) | | | | | 3% | 3% | 3% | 2% | 2% | 2% | 2% | 2% |
| Non-volatile fraction concentration (% by weight) | | | | | 15% | 19% | 19% | 8% | 8% | 8% | 14% | 22% |

[Surface Treatment Liquids B]

The surface treatment liquids B described below are examples of investigations into a variety of surface treatment liquids for porous sound-absorbing materials, using a variety of colorant-fixing components, either individually or in combinations.

The components shown in Table 2 were premixed in the proportions shown in Table 2, and the resulting mixtures were then each dispersed for one minute using a homogenizer to obtain surface treatment liquids B.

TABLE 2

Surface Treatment Liquids, Production Example B

| Formulation | Product name/ compound name | Average particle size (nm) | Non-volatile fraction concentration | Treatment liquid B1 | Treatment liquid B2 | Treatment liquid B3 | Treatment liquid B4 | Treatment liquid B5 | Treatment liquid B6 | Treatment liquid B7 | Treatment liquid B8 | Treatment liquid B9 | Treatment liquid B10 |
|---|---|---|---|---|---|---|---|---|---|---|---|---|---|
| Cationic large particles (water-dispersible resin particles) | PP-15 | 1800 | 25% | 11.9 | | | | | | 11.9 | 11.9 | 11.9 | |
| | PP-17 | 2500 | 26% | | 11.5 | | | | | | | | |
| Polyvalent metal salt | CaNO$_3$ | | 30% | | | | 10.0 | | | | | | |
| | CaCl$_2$ | | 30% | | | 10.0 | | | | | 10.0 | | 10.0 |
| Inorganic particles | SNOWTEX AK | 44 | 18% | | | | | | 16.7 | | | 16.7 | |
| | SNOWTEX AK-L | 79 | 20% | | | | | 15.0 | | | | | |
| Cationic small particles (water-dispersible resin particles) | POLYSOL AP-1370 | 206 | 47% | | | | | | | | | | |
| | POLYSOL AE-803 | 419 | 45% | | | | | | | | | | 6.7 |
| Nonionic resin particles | Mowinyl 7720 | 379 | 45% | | | | | | | 6.7 | | | |
| Cationic water-soluble resin | Hybrane PX-100 | | 50% | | | | | | | | | | |
| Surfactant | SILFACE SAG503A | | 100% | 1.0 | 1.0 | 1.0 | 1.0 | 1.0 | 1.0 | 1.0 | 1.0 | 1.0 | 1.0 |
| | OLFINE E1010 | | 100% | 1.0 | 1.0 | 1.0 | 1.0 | 1.0 | 1.0 | 1.0 | 1.0 | 1.0 | 1.0 |
| | Water | | | 86.1 | 86.5 | 88.0 | 88.0 | 83.0 | 81.3 | 79.4 | 76.1 | 69.4 | 81.3 |
| Total | | | | 100.0 | 100.0 | 100.0 | 100.0 | 100.0 | 100.0 | 100.0 | 100.0 | 100.0 | 100.0 |
| Non-volatile fraction concentration (% by weight) | | | | 5% | 5% | 5% | 5% | 5% | 5% | 8% | 8% | 8% | 8% |

| Formulation | Product name/ compound name | Average particle size (nm) | Non-volatile fraction concentration | Treatment liquid B11 | Treatment liquid B12 | Treatment liquid B13 | Treatment liquid B14 | Treatment liquid B15 | Treatment liquid B16 | Treatment liquid B17 | Treatment liquid B18 | Treatment liquid B19 |
|---|---|---|---|---|---|---|---|---|---|---|---|---|
| Cationic large particles (water-dispersible resin particles) | PP-15 | 1800 | 25% | | | | | | | 63.2 | 23.7 | |
| | PP-17 | 2500 | 26% | | | | | | | | | |
| Polyvalent metal salt | CaNO$_3$ | | 30% | | | | | | | | | |
| | CaCl$_2$ | | 30% | 10.0 | 10.0 | | | | | | | |
| Inorganic particles | SNOWTEX AK | 44 | 18% | | | | 16.7 | | | | | |
| | SNOWTEX AK-L | 79 | 20% | | | 15.0 | | 15.0 | | | | |
| | MIZUKASIL P-73 | 4000 | 100% | | | | | | | 8.0 | | |
| Cationic small particles (water-dispersible resin particles) | SUNPLEX PUE-C200B | 129 | 32% | | | | | | | 25.0 | | |
| | POLYSOL AP-1370 | 206 | 47% | | | | | | | | | 34.4 |
| | POLYSOL AE-803 | 419 | 45% | | | 6.7 | 6.7 | 13.3 | | | | |
| Nonionic resin particles | Mowinyl 7720 | 379 | 45% | 6.7 | | | | | | | | |
| Cationic water-soluble resin | Hybrane PX-100 | | 50% | | | | | | | | | 16.0 |

TABLE 2-continued

| | | | Surface Treatment Liquids, Production Example B | | | | | | | | |
|---|---|---|---|---|---|---|---|---|---|---|---|
| Surfactant | SILFACE SAG503A | 100% | 1.0 | 1.0 | 1.0 | 1.0 | 1.0 | 1.0 | 1.0 | | 1.0 |
| | SURFYNOL 465 | 100% | | | | | | | | 1.0 | |
| | OLFINE E1010 | 100% | 1.0 | 1.0 | 1.0 | 1.0 | 1.0 | | | | |
| | Water | | 81.3 | 73.0 | 74.6 | 76.3 | 84.7 | 66.0 | 35.8 | 59.3 | 64.6 |
| | Total | | 100.0 | 100.0 | 100.0 | 100.0 | 100.0 | 100.0 | 100.0 | 100.0 | 100.0 |
| Non-volatile fraction concentration (% by weight) | | | 8% | 8% | 8% | 8% | 8% | 17% | 17% | 15% | 17% |

[Surface Treatment Liquids C]

The surface treatment liquids C described below are examples of investigations into surface treatment liquids for porous sound-absorbing materials containing no colorant-fixing components, and are used for the purposes of comparison.

The components shown in Table 3 were premixed in the proportions shown in Table 3, and the resulting mixtures were then each dispersed for one minute using a homogenizer, thus obtaining a surface treatment liquid C2. The surface treatment liquid C1 aggregated during premixing, and preparation could not be completed.

TABLE 3

| | | Surface Treatment Liquids, Production Example C | | | |
|---|---|---|---|---|---|
| Formulation | Product name/ compound name | Average particle size (nm) | Non-volatile fraction concentration | Treatment liquid C1 | Treatment liquid C2 |
| Anionic water-dispersible resin particles | SUPERFLEX 470 | 83 | 38% | 52.6 | |
| Cationic water-soluble resin | Hybrane PX-100 | | 50% | | 40.0 |
| Surfactant | SILFACE SAG503A | | 100% | | 1.0 |
| | SURFYNOL 465 | | 100% | 1.0 | |
| | OLFINE E1010 | | 100% | | 1.0 |
| | Water | | | 46.4 | 58.0 |
| | Total | | | 100.0 | 100.0 |
| Non-volatile fraction concentration (% by weight) | | | | 21% | 22% |

Details relating to the various raw materials shown in Tables 2 ands 3 (excluding those that also appear in Table 1) are as follows.

CaNO$_3$: 30% aqueous solution of calcium nitrate
CaCl$_2$: 30% aqueous solution of calcium chloride SNOWTEX AK: a cationic colloidal silica (average particle size: 44 nm), manufactured by Nissan Chemical Industries, Ltd.

SNOWTEX AK-L: a cationic colloidal silica (average particle size: 79 nm), manufactured by Nissan Chemical Industries, Ltd.

MIZUKASIL P-73: gel silica particles (average particle size: 4 μm), manufactured by Mizusawa Industrial Chemicals, Ltd.

Mowinyl 7720: a nonionic acrylic resin emulsion (average particle size: 379 nm), manufactured by The Nippon Synthetic Chemical Industry Co., Ltd.

Hybrane PX-100: a cationic water-soluble multibranched polyesteramide resin, manufactured by DSM N.V.

SUPERFLEX 470: an anionic water-based urethane resin emulsion (average particle size: 83 nm), manufactured by DKS Co., Ltd.

<Preparation of Aqueous Inks>

1. Ink Set 1

The components shown in Table 4 were premixed in the proportions shown in Table 4, and the thus obtained dispersions were each filtered through a membrane filter with a pore size of 3 μm, thus obtaining an ink set 1 composed of aqueous inks 1 to 4 (C, M, Y and K, in that order).

Details relating to the raw materials shown in Table 4 (excluding those that also appear in any of Tables 1 to 3) are as follows. The glycerol was a special grade reagent manufactured by Wako Pure Chemical Industries, Ltd.

BONJET BLACK CW-4: a water-based self-dispersible carbon black dispersion, manufactured by Orient Chemical Industries, Ltd.

CAB-O-JET 250C: a water-based self-dispersible cyan pigment dispersion, manufactured by Cabot Corporation.

CAB-O-JET 260M: a water-based self-dispersible magenta pigment dispersion, manufactured by Cabot Corporation.

CAB-O-JET 270Y: a water-based self-dispersible yellow pigment dispersion, manufactured by Cabot Corporation.

TABLE 4

| | | Aqueous Ink Set 1, Production Example | | | | |
|---|---|---|---|---|---|---|
| | | Non-volatile | Ink set 1 | | | |
| Formulation | Product name | fraction concentration | Aqueous ink 1 | Aqueous ink 2 | Aqueous ink 3 | Aqueous ink 4 |
| Pigment dispersion | BONJET BLACK CW-4 | 13% | 46.2 | | | |
| | CAB-O-JET 250C | 10% | | 60.0 | | |
| | CAB-O-JET 260M | 10% | | | 60.0 | |
| | CAB-O-JET 270Y | 10% | | | | 60.0 |
| Binder | SUPERFLEX 470 | 38% | 11.8 | 11.8 | 11.8 | 11.8 |
| Water-miscible organic solvent | Glycerol | 100% | 20.0 | 20.0 | 20.0 | 20.0 |
| Surfactant | SURFYNOL 465 | 100% | 3.0 | 3.0 | 3.0 | 3.0 |
| | Water | | 19.0 | 5.2 | 5.2 | 5.2 |
| | Total | | 100.0 | 100.0 | 100.0 | 100.0 |

2. Ink Sets 2 and 3

Ink sets 2 and 3 shown in Table 5 were produced in the same manner as the ink set 1 described above.

TABLE 5

Aqueous Ink Sets 2 and 3, Production Examples

| Formulation | Product name | Non-volatile fraction concentration | Ink set 2 C | M | Y | K | Ink set 3 C | M | Y | K |
|---|---|---|---|---|---|---|---|---|---|---|
| Pigment dispersion | BONJET BLACK CW-4 | 13% | 23.1 | | | | 23.1 | | | |
| | CAB-O-JET 250C | 10% | | 30.0 | | | | 30.0 | | |
| | CAB-O-JET 260M | 10% | | | 30.0 | | | | 30.0 | |
| | CAB-O-JET 270Y | 10% | | | | 30.0 | | | | 30.0 |
| Binder | SUPERFLEX 470 | 38% | 7.9 | 7.9 | 7.9 | 7.9 | 15.8 | 15.8 | 15.8 | 15.8 |
| Water-miscible organic solvent | Glycerol | 100% | 20.0 | 20.0 | 20.0 | 20.0 | 20.0 | 20.0 | 20.0 | 20.0 |
| Surfactant | SURFYNOL 465 | 100% | 3.0 | 3.0 | 3.0 | 3.0 | 3.0 | 3.0 | 3.0 | 3.0 |
| | Water | | 46.0 | 39.1 | 39.1 | 39.1 | 38.1 | 31.2 | 31.2 | 31.2 |
| | Total | | 100.0 | 100.0 | 100.0 | 100.0 | 100.0 | 100.0 | 100.0 | 100.0 |

A porous sound-absorbing material "NDC CALME" (an aluminum sintered sound-absorbing material, manufactured by NDC Sales Co., Ltd.) was surface-treated by immersion in one of the surface treatment liquids A1 to A11 shown in Table 1, and was then dried for 5 minutes on a 70° C. sheet heater. The amount of the surface treatment liquid was as shown in Table 7.

Subsequently, the ink set 1 described above was loaded into the KCMY ink heads of a commercially available aqueous pigment inkjet printer, and a full-color photographic image, a solid-color image, and a text and fine-line image were printed onto each of the surface-treated NDC CALME samples, and also onto an untreated NDC CALME sample. Following the completion of printing, each sample was heated for 130 seconds on a 70° C. sheet heater, and then subjected to the following evaluations.

The evaluation criteria for Example A are shown in Table 6, and for each evaluation, an overall evaluation grade was recorded as the average across the evaluations performed for the three types of images, namely the photographic image, the solid-color image, and the text and fine-line image.

TABLE 6

Evaluation Criteria

| | | |
|---|---|---|
| Objective visual evaluation | AAA | Density and bleeding both favorable, extremely good representation of image |
| | AA | Density and bleeding both favorable, good representation of image |
| | A | Density and bleeding both favorable, fair representation of image |
| | B | Some minor problems with density or bleeding |
| | C | Image density is weak, but image is discernible |
| | D | Image undiscernible |
| Image water abrasion resistance evaluation (1) | A | The image was not removed even after 30 or more rubbing repetitions with a wet sponge |
| | B | The image was removed after 10 or more but less than 30 rubbing repetitions with a wet sponge |
| | C | The image was removed after less than 10 rubbing repetitions with a wet sponge |
| Image water abrasion resistance evaluation (2) | A | The image was not removed even after 20 or more rubbing repetitions with a wet cotton swab |
| | B | The image was removed after 10 or more but less than 20 rubbing repetitions with a wet cotton swab |
| | C | The image was removed after 5 or more but less than 10 rubbing repetitions with a wet cotton swab |
| | D | The image was removed after less than 5 rubbing repetitions with a wet cotton swab |
| Air permeability evaluation (sound-absorbing performance) | A | Difference in flow resistance from undecorated sample of less than 20 mmH$_2$O |
| | B | Difference in flow resistance from undecorated sample of at least 20 mmH$_2$O but less than 30 mmH$_2$O |
| | C | Difference in flow resistance from undecorated sample of at least 30 mmH$_2$O |

As illustrated in Table 6, the sound-absorbing performance was evaluated in a simple manner by measuring the air permeability. This measurement used the method of evaluating the air permeability of textile products by the Frazier method prescribed in ISO-9237, and involved placing a test piece in an air stream having a constant flow rate, and measuring the pressure difference between the front and rear surfaces of the test piece. Specifically, using a Frazier permeability tester (manufactured by Yasuda Seiki Seisakusho Ltd.), a test piece formed from the decorated sound-absorbing material was placed in an air stream having a constant flow rate under conditions including an air flow volume of 250 L/minute per 100 cm$^2$ of test piece surface area, and a flow rate of 41.7 cm/second, and the pressure difference between the front and rear surfaces of the test piece was recorded as the "flow resistance". The smaller the difference in this flow resistance value compared with the value for the undecorated sound-absorbing material, the more the decorated sound-absorbing material can be adjudged as suffering minimal deterioration in the sound absorption coefficient at each of the various conventional frequencies compared with the undecorated sound-absorbing material.

The results for Example A are shown in Table 7.

TABLE 7

Example A

| | | Example A1 | Example A2 | Example A3 | Example A4 | Example A5 | Example A6 | Example A7 | Example A8 | Example A9 | Example A10 | Example A11 | Example A12 |
|---|---|---|---|---|---|---|---|---|---|---|---|---|---|
| Surface treatment liquid | | A1 | A2 | A3 | A4 | A5 | A6 | A7 | A8 | A9 | A10 | A11 | A2 |
| Amount of treatment liquid (g/m²) | | 150 | 150 | 150 | 150 | 150 | 150 | 150 | 150 | 150 | 150 | 150 | 250 |
| Non-volatile fraction in treatment liquid (% by weight) | | 16% | 17% | 8% | 28% | 17% | 19% | 19% | 23% | 15% | 19% | 19% | 19% |
| Adhesion amount (dry, g/m²) | | 24 | 25.5 | 12 | 42 | 25.5 | 28.5 | 28.5 | 34.5 | 22.5 | 28.5 | 28.5 | 47.5 |
| Performance evaluations | Objective visual evaluation | A | AA | AA | AAA | AA | AAA | AAA | AA | AAA | AAA | AA | AA |
| | Image water abrasion resistance evaluation (1) | A | A | B | A | A | A | A | A | B | A | A | A |
| | Image water abrasion resistance evaluation (2) | A | A | A | A | A | A | A | A | A | A | A | A |
| | Air permeability evaluation (sound-absorbing performance) | A | A | A | A | A | A | A | A | A | A | A | B |

In Example A, favorable evaluations of or exceeding the level required for practical application were obtained for all of the evaluation items. The objective visual evaluation yielded particularly superior results.

Example B was performed using one of the surface treatment liquids A12 to A16 described above or the surface treatment liquid B, and one of the ink sets 1 to 3 described above. Using an automatic spray coater, samples of the NDC CALME were sprayed with each of the surface treatment liquids, using an amount of treatment liquid shown in Table 8. Subsequently, each sample was dried in a 100° C. oven for 10 minutes.

Each of the inks of the ink set was loaded into the corresponding color ink head of a commercially available aqueous pigment inkjet printer, and single-color photographic images, solid-color images, and text and fine-line images were printed onto the surface-treated and untreated NDC CALME samples. Following the completion of printing, each sample was dried by heating for 5 minutes in a dryer set to 100° C., and was then evaluated in the same manner as Example A.

For the purpose of comparison, test results are also included for samples using the surface treatment liquid C described above, a commercially available UV ink and a commercially available oil-based ink (Comparative Example B). The UV ink of Comparative Example B2 was an ECO-UV ink designed for a VersaUV LEF-12 UV printer manufactured by Roland DG Corporation, and following printing to the surface-treated NDC CALME using this printer, ultraviolet curing was performed using the UV-LED lamp housed inside the printer. Further, the oil-based ink of Comparative Example B3 was an ink for an ORPHIS EX Series oil-based inkjet printer manufactured by Riso Kagaku Corporation, and the ink was loaded into the inkjet head of the printer, and printed onto the surface-treated NDC CALME.

The results are shown in Table 8.

TABLE 8

Example B and Comparative Example B

| | | Example B1 | Example B2 | Example B3 | Example B4 | Example B5 | Example B6 | Example B7 |
|---|---|---|---|---|---|---|---|---|
| Surface treatment liquid | | B1 | B2 | B3 | B4 | B5 | B6 | A12 |
| Amount of treatment liquid (g/m²) | | 50 | 50 | 50 | 50 | 50 | 50 | 50 |
| Non-volatile fraction in treatment liquid (% by weight) | | 5% | 5% | 5% | 5% | 5% | 5% | 8% |
| Adhesion amount (dry, g/m²) | | 2.5 | 2.5 | 2.5 | 2.5 | 2.5 | 2.5 | 4 |
| Ink | | Ink set 3 | Ink set 3 | Ink set 3 | Ink set 3 | Ink set 3 | Ink set 3 | Ink set 2 |
| Performance evaluations | Decoartive item odor | no | No | no | no | no | no | no |
| | Objective visual evaluation | AA | AA | AA | AA | AA | AA | AAA |
| | Image water abrasion resistance evaluation (2) | A | A | B | B | B | B | A |
| | Air permeability evaluation (sound-absorbing performance) | A | A | A | A | A | A | A |

| | | Example B8 | Example B9 | Example B10 | Example B11 | Example B12 | Example B13 | Example B14 |
|---|---|---|---|---|---|---|---|---|
| Surface treatment liquid | | A13 | B7 | A14 | B8 | B9 | B10 | B11 |
| Amount of treatment liquid (g/m²) | | 50 | 50 | 50 | 50 | 50 | 50 | 50 |

TABLE 8-continued

Example B and Comparative Example B

|  |  |  |  |  |  |  |  |  |
|---|---|---|---|---|---|---|---|---|
| Non-volatile fraction in treatment liquid (% by weight) | | 8% | 8% | 8% | 8% | 8% | 8% | 8% |
| Adhesion amount (dry, g/m$^2$) | | 4 | 4 | 4 | 4 | 4 | 4 | 4 |
| Ink | | Ink set 2 | Ink set 2 | Ink set 2 | Ink set 3 | Ink set 3 | Ink set 2 | Ink set 2 |
| Performance evaluations | Decoartive item odor | no | no | no | no | no | no | no |
| | Objective visual evaluation | AAA | AAA | AAA | AAA | AAA | AAA | AAA |
| | Image water abrasion resistance evaluation (2) | A | A | A | A | A | A | A |
| | Air permeability evaluation (sound-absorbing performance) | A | A | A | A | A | A | A |

| | | Example B15 | Example B16 | Example B17 | Example B18 | Example B19 | Example B20 | Example B21 | Example B22 |
|---|---|---|---|---|---|---|---|---|---|
| Surface treatment liquid | | B12 | B13 | B14 | B15 | A15 | A16 | B16 | B17 |
| Amount of treatment liquid (g/m$^2$) | | 50 | 50 | 50 | 50 | 50 | 50 | 150 | 150 |
| Non-volatile fraction in treatment liquid (% by weight) | | 8% | 8% | 8% | 8% | 14% | 22% | 17% | 17% |
| Adhesion amount (dry, g/m$^2$) | | 4 | 4 | 4 | 4 | 7 | 11 | 25.5 | 25.5 |
| Ink | | Ink set 3 | Ink set 3 | Ink set 3 | Ink set 2 | Ink set 2 | Ink set 2 | Ink set 1 | Ink set 1 |
| Performance evaluations | Decoartive item odor | no | no | no | no | no | no | no | no |
| | Objective visual evaluation | AAA | AAA | AAA | A | AAA | AAA | B | AA |
| | Image water abrasion resistance evaluation (2) | B | A | A | A | A | A | B | B |
| | Air permeability evaluation (sound-absorbing performance) | A | A | A | A | A | A | A | A |

| | | Example B23 | Example B24 | Comparative Example B1 | Comparative Example B2 | Comparative Example B3 | Comparative Example B4 |
|---|---|---|---|---|---|---|---|
| Surface treatment liquid | | B18 | B19 | | B1 | B1 | C2 |
| Amount of treatment liquid (g/m$^2$) | | 150 | 150 | | 50 | 50 | 50 |
| Non-volatile fraction in treatment liquid (% by weight) | | 15% | 17% | | 5% | 5% | 22% |
| Adhesion amount (dry, g/m$^2$) | | 22.5 | 25.5 | | 2.5 | 2.5 | 11 |
| Ink | | Ink set 1 | Ink set 1 | Ink set 1 | UV ink | Oil-based ink | Ink set 2 |
| Performance evaluations | Decoartive item odor | no | no | no | yes | yes | no |
| | Objective visual evaluation | B | C | D | B | D | D |
| | Image water abrasion resistance evaluation (2) | B | A | B | B | C | D |
| | Air permeability evaluation (sound-absorbing performance) | A | A | A | B | A | B |

In Example B also, favorable evaluations of or exceeding the level required for practical application were obtained for all of the evaluation items.

2. Example C

Example C described below is a series of examples investigating various aqueous inks for porous sound-absorbing materials.
<Preparation of Aqueous Inks>

The components shown in Table 9 were premixed in the proportions shown in Table 9, and the thus obtained dispersions were each filtered through a membrane filter with a pore size of 3 μm, thus obtaining aqueous inks 101 to 110. Ink 107 contained neither a water-dispersible resin nor a water-soluble resin, and therefore represents an ink of a comparative example.

Details relating to the raw materials shown in Table 9 (excluding those already described above) are as follows.

The glycerol was a special grade reagent manufactured by Wako Pure Chemical Industries, Ltd.

SUPERFLEX 460S: an anionic water-based urethane resin emulsion (average particle size: 56 nm), manufactured by DKS Co., Ltd.

ADEKA BONTIGHTER HUX-370: an anionic water-based urethane resin emulsion (average particle size: 10 nm), manufactured by ADEKA Corporation SUPERFLEX 150HS: an anionic water-based urethane resin emulsion (average particle size: 83 nm), manufactured by DKS Co., Ltd.

Mowinyl 6969D: an anionic water-based acrylic resin emulsion (average particle size: 113 nm), manufactured by The Nippon Synthetic Chemical Industry Co., Ltd.

SUPERFLEX 740: an anionic water-based urethane resin emulsion (average particle size: 170 nm), manufactured by DKS Co., Ltd.

PVA203 10% aqueous solution: a polyvinyl alcohol resin, manufactured by Kuraray Co., Ltd.

TABLE 9

Aqueous Inks, Production Examples

| Formulation | Product name | Non-volatile fraction concentration | Ink 101 | Ink 102 | Ink 103 | Ink 104 | Ink 105 | Ink 106 | Ink 107 | Ink 108 | Ink 109 | Ink 110 |
|---|---|---|---|---|---|---|---|---|---|---|---|---|
| Pigment dispersion | BONJET BLACK CW-4 | 13% | | | | | | | | 23.1 | | |
| | CAB-O-JET 250C | 10% | 30.0 | 30.0 | 30.0 | 30.0 | 30.0 | 30.0 | 30.0 | | | |
| | CAB-O-JET 260M | 10% | | | | | | | | | 30.0 | |
| | CAB-O-JET 270Y | 10% | | | | | | | | | | 30.0 |
| Binder resin | SUPERFLEX 460S | 38% | 11.8 | | | | | | | | | |
| | ADEKA BONTIGHTER HUX-370 | 33% | | 13.6 | | | | | | 13.6 | 13.6 | 13.6 |
| | SUPERFLEX 150HS | 38% | | | 11.8 | | | | | | | |
| | Mowinyl 6969D | 40% | | | | | | | 11.3 | | | |
| | SUPERFLEX 740 | 40% | | | | | 11.3 | | | | | |
| | PVA203 10% aqueous solution | 10% | | | | | | 45.0 | | | | |
| Water-miscible organic solvent | Glycerol | 100% | 20.0 | 20.0 | 20.0 | 20.0 | 20.0 | 20.0 | 20.0 | 20.0 | 20.0 | 20.0 |
| Surfactant | SURFYNOL 465 | 100% | 1.0 | 1.0 | 1.0 | 1.0 | 1.0 | 1.0 | 1.0 | 1.0 | 1.0 | 1.0 |
| | Water | | 37.2 | 35.4 | 37.2 | 37.7 | 4.0 | 37.7 | 49.0 | 42.3 | 35.4 | 35.4 |
| | Total | | 100.0 | 100.0 | 100.0 | 100.0 | 100.0 | 100.0 | 100.0 | 100.0 | 100.0 | 100.0 |

<Preparation of Surface Treatment Liquids>

The components shown in Table 10 were premixed in the proportions shown in Table 10, and the resulting mixtures were then each dispersed for one minute using a homogenizer to obtain surface treatment liquids 101 and 102.

TABLE 10

Surface Treatment Liquids, Production Examples

| Formulation | Product name | Non-volatile fraction concentration | Treatment liquid 101 | Treatment liquid 102 |
|---|---|---|---|---|
| Cationic large particles | PP-15 | 25% | 19.8 | 19.8 |
| Cationic small particles | PASCOL JK-870 | 30% | 23.7 | |
| | POLYSOL AP-1370 | 47% | | 15.1 |
| Silicone-based surfactant | SILFACE SAG503A | 100% | 2.0 | 2.0 |
| | Water | | 54.5 | 63.1 |
| | Total | | 100.0 | 100.0 |
| | Non-volatile fraction concentraton (% by weight) | | 14% | 14% |
| | Amount of surfactant (% by weight) | | 2.0% | 2.0% |

<Evaluations>

Samples of the porous sound-absorbing material "NDC CALME" (an aluminum sintered sound-absorbing material, manufactured by NDC Sales Co., Ltd.) were sprayed with the surface treatment liquid 101 or 102 shown in Table 10 using an automatic spray coater and a spray amount of 150 g/m² (non-volatile fraction: 21 g/m²), and the samples were then dried for 5 minutes on a 70° C. sheet heater.

Subsequently, one of the inks 101 to 110 shown in Table 9 was loaded into the corresponding color ink head of a commercially available aqueous pigment inkjet printer, and single-color photographic images, solid-color images, and text and fine-line images were printed onto the surface-treated and untreated NDC CALME samples.

Following the completion of printing, each sample was dried by heating for 5 minutes in a dryer set to 150° C., and was then evaluated in the manner described below.

The evaluation criteria for Example C and Comparative Example C are shown in Table 11, and for each evaluation, an overall evaluation grade was recorded as the average across the evaluations performed for the three types of images, namely the photographic image, the solid-color image, and the text and fine-line image.

TABLE 11

| Evaluation Criteria | | |
|---|---|---|
| Objective visual evaluation | AAA | Density and bleeding both favorable, extremely good representation of image |
| | A | Density and bleeding both favorable, fair representation of image |
| | B | Some minor problems with density or bleeding |
| | C | Poor representation of image |
| Image abrasion resistance evaluation | AA | The image was not removed even after 30 or more rubbing repetitions with a dry cotton cloth |
| | A | The image was not removed even after 20 or more but less than 30 rubbing repetitions with a dry cotton cloth |
| | B | The image was removed after 10 or more but less than 20 rubbing repetitions with a dry cotton cloth |
| | C | The image was removed after less than 10 rubbing repetitions with a dry cotton cloth |
| Image water resistance evaluation | AA | The image was not removed even after 30 or more rubbing repetitions with a wet sponge |
| | A | The image was not removed even after 20 or more but less than 30 rubbing repetitions with a wet sponge |
| | B | The image was removed after 10 or more but less than 20 rubbing repetitions with a wet sponge |
| | C | The image was removed after less than 10 rubbing repetitions with a wet sponge |
| Air permeability evaluation (sound-absorbing performance) | A | Difference in flow resistance from undecorated sample of less than 20 mmH₂O |
| | B | Difference in flow resistance from undecorated sample of at least 20 mmH₂O but less than 30 mmH₂O |
| | C | Difference in flow resistance from undecorated sample of at least 30 mmH₂O |

In Table 11, evaluation of the sound-absorbing performance employed an evaluation method relying on the air permeability. This is the same evaluation method as that described above for Example A.

The results for Example C and Comparative Example C are shown in Table 12.

TABLE 12

Example C and Comparative Example C

|  |  | Example C1 | Example C2 | Example C3 | Example C4 | Example C5 | Example C6 | Example C7 |
|---|---|---|---|---|---|---|---|---|
|  | Ink | Ink 101 | Ink 102 | Ink 103 | Ink 104 | Ink 105 | Ink 106 | Ink 101 |
|  | Surface treatment liquid | Treatment liquid 102 | Treatment liquid 102 | Treatment liquid 102 | Treatment liquid 102 | Treatment liquid 102 | Treatment liquid 102 | Treatment liquid 101 |
| Performance evaluations | Objective visual evaluation | AA | AA | AA | AA | A | A | AA |
|  | Image abrasion resistance evaluation | AA | AA | AA | A | A | AA | AA |
|  | Image water resistance | AA | AA | AA | A | B | AA | AA |
|  | Air permeability evaluation (sound-absorbing performance) | A | A | A | A | A | A | A |

|  |  | Example C8 | Example C9 | Example C10 | Example C11 | Comparative Example C1 | Comparative Example C2 |
|---|---|---|---|---|---|---|---|
|  | Ink | Ink 101 | Ink 108 | Ink 109 | Ink 110 | Ink 101 | Ink 107 |
|  | Surface treatment liquid | Treatment liquid 102 | Treatment liquid 02 | Treatment liquid 102 | Treatment liquid 102 | none | Treatment liquid 102 |
| Performance evaluations | Objective visual evaluation | AA | AA | AA | AA | C | B |
|  | Image abrasion resistance evaluation | AA | AA | AA | AA | B | C |
|  | Image water resistance | AA | AA | AA | AA | B | C |
|  | Air permeability evaluation (sound-absorbing performance) | A | A | A | A | A | A |

In Example C, favorable evaluations of or exceeding the level required for practical application were obtained for all of the evaluation items.

In contrast, in Comparative Example C1 in which no surface treatment was performed, and in Comparative Example C2 which used an ink containing neither a water-dispersible resin nor a water-soluble resin, a favorable result was unobtainable for at least one of the evaluation items.

What is claimed is:

1. A surface treatment liquid for a porous sound-absorbing material comprising water and a colorant-fixing component,
    wherein the colorant-fixing component comprises a cationic water-dispersible resin, and
    wherein the cationic water-dispersible resin comprises large particles having a median size measured by a dynamic light scattering method of at least 1 µm but not more than 10 µm and small particles having a median size measured by a dynamic light scattering method of less than 1 µm.

2. The surface treatment liquid for a porous sound-absorbing material according to claim 1, further comprising a surfactant.

3. A method for producing a surface-treated porous sound-absorbing material comprising a porous metal body, the method comprising: applying a surface treatment liquid for a porous sound-absorbing material to a surface of the porous metal body of the porous sound-absorbing material, wherein the surface treatment liquid comprises water and a colorant-fixing component, and
    wherein the colorant-fixing component comprises at least one component selected from the group consisting of cationic water-dispersible resins, inorganic particles having a median size measured by a dynamic light scattering method of less than 1 µm, and polyvalent metal salts.

4. A method for producing a surface-treated porous sound-absorbing material, comprising: applying a surface treatment liquid for a porous sound-absorbing material to a surface of the porous sound-absorbing material,
    wherein the surface treatment liquid comprises water and a colorant-fixing component,
    wherein the colorant-fixing component comprises a cationic water-dispersible resin, and
    wherein the cationic water-dispersible resin comprises large particles having a median size measured by a dynamic light scattering method of at least 1 µm but not more than 10 µm and small particles having a median size measured by a dynamic light scattering method of less than 1 µm.

5. The method according to claim 3, wherein the surface treatment liquid further comprises a surfactant.

6. The method according to claim 4, wherein the surface treatment liquid further comprises a surfactant.

7. A method for producing a decorated porous sound-absorbing material comprising a porous metal body, the method comprising:
    applying a surface treatment liquid for a porous sound-absorbing material to a surface of the porous metal body of the porous sound-absorbing material; and performing inkjet printing using an aqueous inkjet ink comprising water, a water-dispersible resin and/or a water-soluble resin, and a colorant, wherein the surface treatment liquid comprises water and a colorant-fixing component, and wherein the colorant-fixing component comprises at least one component selected from the group consisting of cationic water-dispersible resins, inorganic particles having a median size measured by a dynamic light scattering method of less than 1 μm, and polyvalent metal salts.

8. A method for producing a decorated porous sound-absorbing material, comprising:

applying a surface treatment liquid for a porous sound-absorbing material to a surface of the porous sound-absorbing material; and performing inkjet printing using an aqueous inkjet ink comprising water, a water-dispersible resin and/or a water-soluble resin, and a colorant, wherein the surface treatment liquid comprises water and a colorant-fixing component, wherein the colorant-fixing component comprises a cationic water-dispersible, and wherein the cationic water-dispersible resin comprises large particles having a median size measured by a dynamic light scattering method of at least 1 μm but not more than 10 μm and small particles having a median size measured by a dynamic light scattering method of less than 1 μm.

9. The method according to claim 7, wherein the surface treatment liquid further comprises a surfactant.

10. The method according to claim 8, wherein the surface treatment liquid further comprises a surfactant.

11. The surface treatment liquid for a porous sound-absorbing material according to claim 1, wherein the large particles comprise a complex organic particle.

12. The method according to claim 3, wherein the porous metal body comprises an aluminum sintered sound-absorbing material.

13. The method according to claim 7, wherein the porous metal body comprises an aluminum sintered sound-absorbing material.

14. The method according to claim 4, wherein the large particles comprise a complex organic particle.

15. The method according to claim 8, wherein the large particles comprise a complex organic particle.

* * * * *